United States Patent
Bae (10) Patent No.: US 7,222,338 B2
(45) Date of Patent: May 22, 2007

(54) METHOD FOR UPGRADING DATA

(75) Inventor: Chul Min Bae, Seoul (KR)

(73) Assignee: LG-Nortel, Co., Ltd., Seoul (KR)

( * ) Notice: Subject to any disclaimer, the term of this patent is extended or adjusted under 35 U.S.C. 154(b) by 497 days.

(21) Appl. No.: 10/219,545

(22) Filed: Aug. 16, 2002

(65) Prior Publication Data

US 2003/0037323 A1    Feb. 20, 2003

(30) Foreign Application Priority Data

Aug. 18, 2001  (KR) ............................... 2001-49820

(51) Int. Cl.
*G06F 9/44*  (2006.01)
(52) U.S. Cl. ..................................... 717/168
(58) Field of Classification Search ............... 717/168, 717/174, 170, 172, 162
See application file for complete search history.

(56) References Cited

U.S. PATENT DOCUMENTS

| | | | | |
|---|---|---|---|---|
| 5,359,730 A | * | 10/1994 | Marron | 717/169 |
| 5,649,200 A | * | 7/1997 | Leblang et al. | 717/122 |
| 5,805,899 A | * | 9/1998 | Evans et al. | 717/170 |
| 5,878,422 A | * | 3/1999 | Roth et al. | 707/100 |
| 6,425,125 B1 | * | 7/2002 | Fries et al. | 717/168 |
| 6,735,768 B1 | * | 5/2004 | Tanaka | 717/174 |
| 6,748,584 B1 | * | 6/2004 | Witchel et al. | 717/136 |
| 2002/0124243 A1 | * | 9/2002 | Broeksteeg et al. | 717/168 |

* cited by examiner

*Primary Examiner*—Wei Zhen
*Assistant Examiner*—Chih-Ching Chow
(74) *Attorney, Agent, or Firm*—Ked & Associates, LLP.

(57) ABSTRACT

A method for upgrading data in a system adapted to implementing one or more programs includes a) loading a new program into the system and a version adapter for changing the old data previously stored in the system; b) generating new data adapted to the new program by processing the old data using the version adapter; c) storing the generated new data in a separate memory area; d) determining whether the new program operates normally by implementing the new data; and e) deleting an old program and old data if the new program is determined to operate normally.

33 Claims, 11 Drawing Sheets

METHOD FOR UPGRADING DATA

BACKGROUND OF THE INVENTION

1. Field of the Invention

The present invention relates to a method for upgrading data used for operation of a system, and more particularly to a method for upgrading a processing system with new data and a new program by processing old data using a data version adapter, and the new program can then be implemented in the processor using the new data.

2. Background of the Related Art

Figure 1:
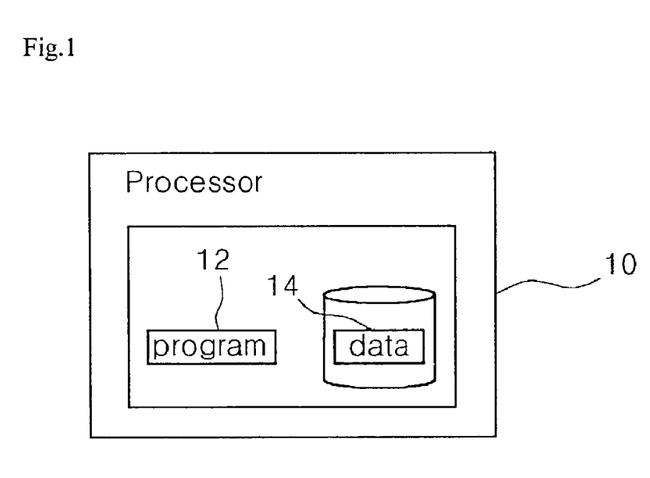
FIG. 1 is a block diagram illustrating a program and data stored in a processor.

A system is generally operated using a plurality of processors. As shown in FIG. 1, these processors normally include a program 12 and data 14 stored in a storage medium which is to be used by the program. Processor 10 operates the program and the data to perform a specific function. The program 12 and the data 14 are separately stored in a test field and a data field. The program 12 may be upgraded to improve or change a function of the system. In this case, a data structure of the program may be changed after upgrading the program. In other words, a data structure adapted to an upgraded new program may differ from a data structure before upgrading the program.

Meanwhile, an old program may be changed to a new program upgraded by uniform downloading. However, the data are not downloaded due to bulk size, and a method for upgrading data in which attributes of the data used in the old program are only changed is applied to the new program.

Figure 2:
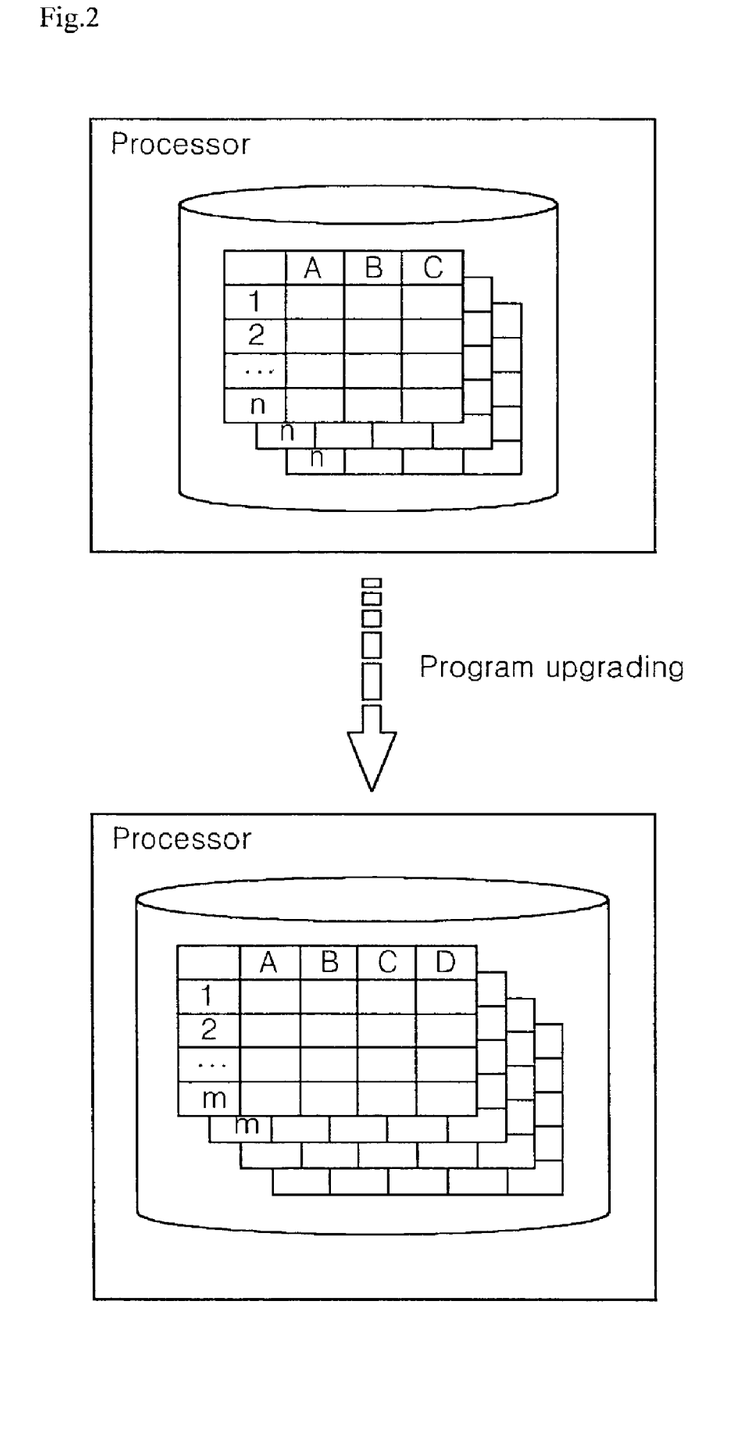
FIG. 2 is a block diagram illustrating a data structure changed after upgrading a program.

FIG. 2 illustrates a case where there is a change in the number of tables, attributes and records in a data structure after data has been upgraded. In the process of upgrading an old program which is operating in a processor, if the processor is operated by loading new data without changing a data structure of the old program (hereinafter, referred to as "old data structure") which is operating in the processor before upgrading the program, the data structure of the new program differs from the data structure (old data structure) actually operating in the processor. This causes an error in the operation of the system.

Figure 3:
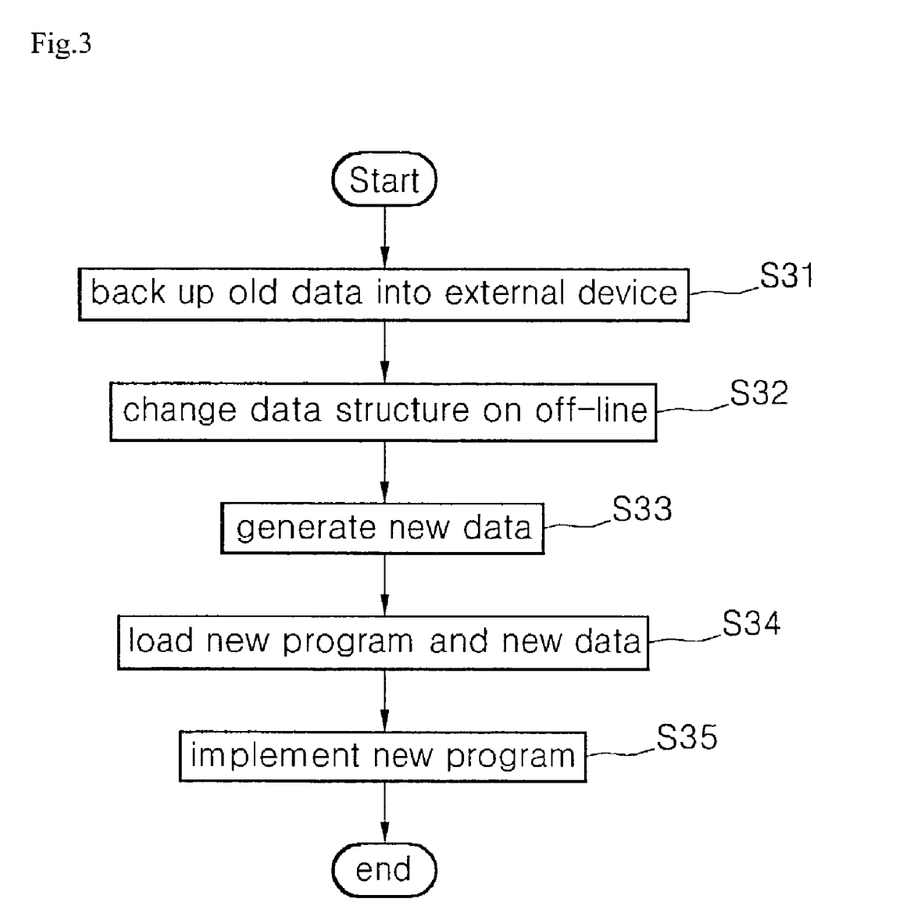
FIG. 3 is a flow chart illustrating a conventional method for upgrading data in a processor.
Figure 4:
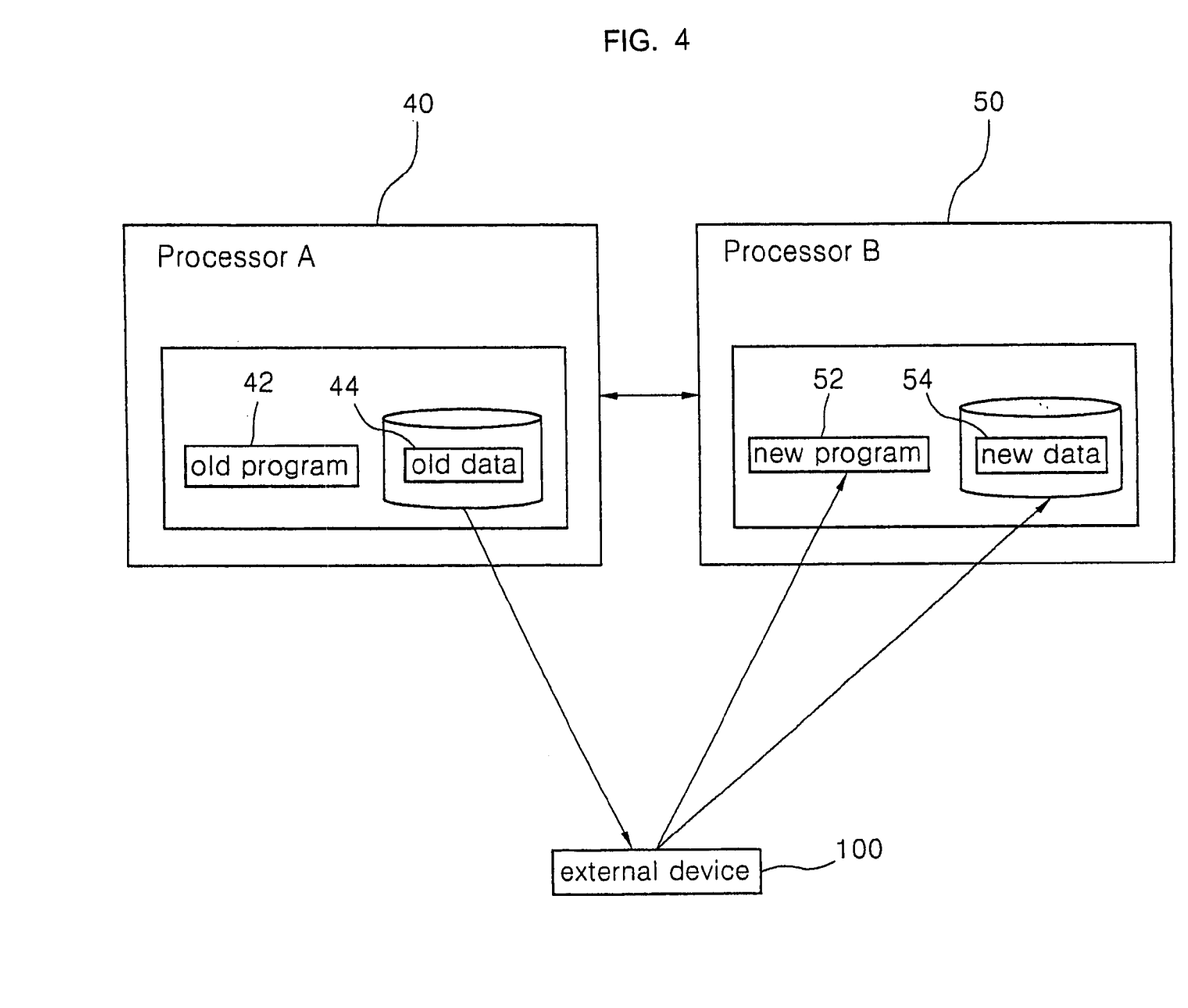
FIG. 4 is a block diagram illustrating a conventional method for upgrading data in double processors.

To prevent system errors due to upgrading the program, as shown in FIGS. 3 and 4, old data 44 of an old program 42 operating in the processor is backed up into an external device 100 in step S31. Then, the structure of the backed up old data 44 is changed to adapt to a new program 42 which will be loaded into the processor, thereby generating new data 54 in steps S32 and S33.

The external device changes the structure of the old data 44 to generate the new data 54. Also, the external device stores the new program 52 which will be loaded into the processor and loads the new program 52 and the new data 54 into the processor 50. In other words, the new data 54 and the new program 52 are loaded into the processor in step S34, so that the new program 52 is implemented in the new program 52 in step S35.

Meanwhile, as shown in FIG. 4, two processors, namely, an active processor 40 and a standby processor 50, may be provided in the system to stably operate the system. If two processors are provided in the system, the active processor which stores the old program 42 and the old data 44 backs up the old data 44 into the external device 100 of the system. The data structure is then changed to adapt to the new program 52 so that the new data 54 are generated. The data are upgraded in such a standby loading way that the generated new data 54 and the new program 52 are loaded into the processor 50.

Figure 5:
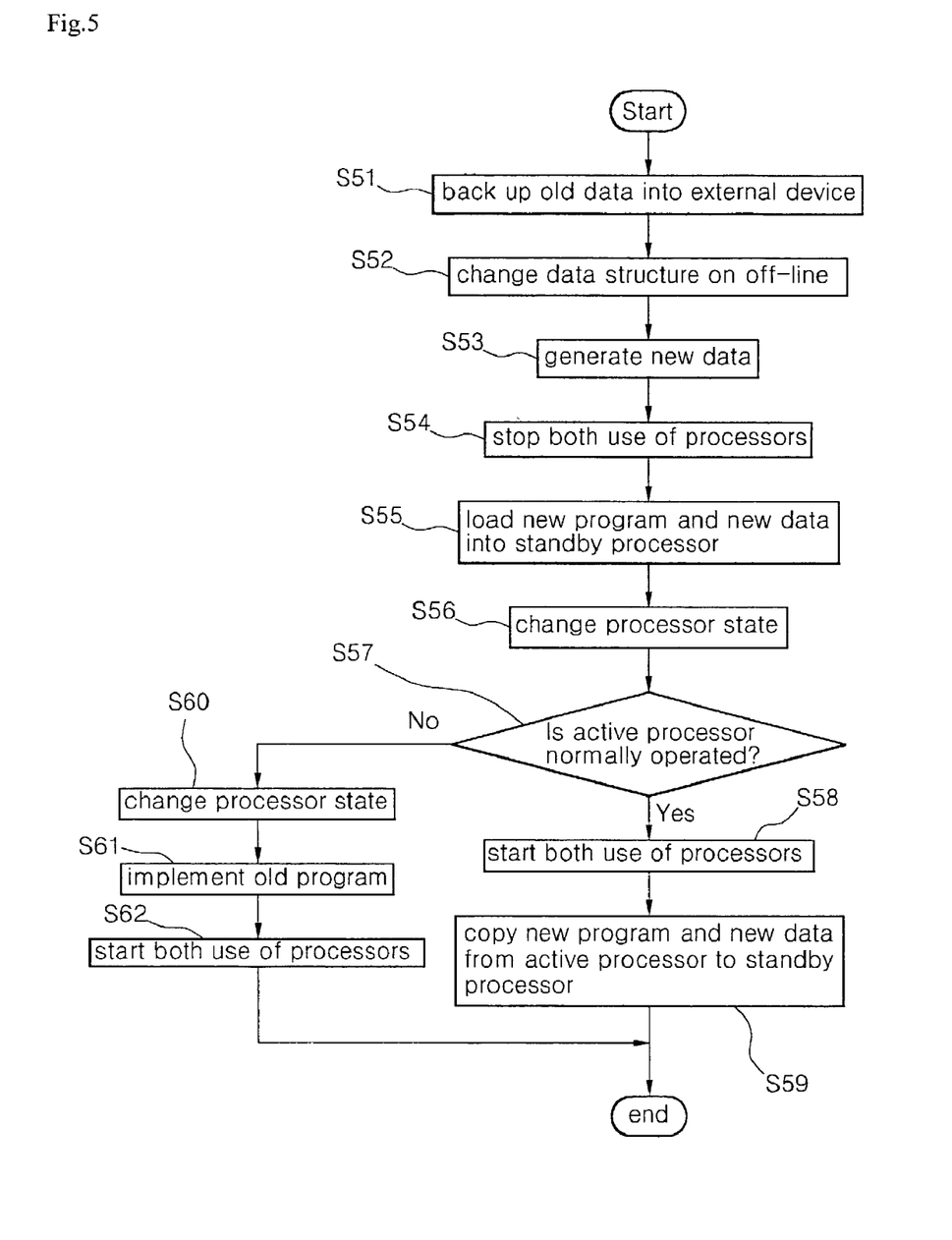
FIG. 5 is a flow chart illustrating a conventional method for upgrading data in double processors.

A method for upgrading a program in case where two processors are provided will be described with reference to FIGS. 4 and 5. It is assumed that the processor 40 (or the processor A) is active and the processor 50 (or the processor B) is on standby.

According to this method, the old data 44 stored in the processor A is backed up into the external device 100 of the system and then the structure of the backed up old data 44 is changed to adapt to the new program 52 which will be loaded, thereby generating the new data 54 in steps S52 and S53. Both use the active processor and the standby processor, which are operating with the old program and the old data, is stopped in step S54. The new data 54 and the new program 52 are loaded into the standby processor B in step S55. Also, the processor A, which is active, is changed to a standby state, and at the same time the processor B which is on standby is changed to an active state in step S56. In step S57, it is determined whether the processor B into which the new program 52 and the new data 54 are loaded is normally operated.

If the processor B is normally operated, both processors are operated in step S58. Then, in step S59, the new program 52 and the new data 54 are copied from the processor B, which is active, to the processor A which is on standby.

However, if the processor B is not normally operated, the processor B is changed to a standby state and at the same time the processor A is changed to an active state in step S60. After the old program 42 stored in the processor A is implemented in step S61, both processors are operated to return to the state before upgrading the program and the data in step S62.

As described above, the conventional system upgrades data in such a way that the data operating in the active processor A of the system are backed up into the external device, so that the data structure may be changed to adapt to the new program and the changed new data and the new program may be loaded into the standby processor B. In this case, the following problems occur.

Since the operation of changing the data backed up into the external device of the system to the data structure adapted to the new program is performed by the processor off-line, much time is required. (Particularly, more problems occur in case of backed up data on an overseas line). Also, the management (adding/deleting) of data and elements of the system is limited for a time period (several hours~several days) required to process the operating data to adapt to the new program by backup. In other words, the conventional method for upgrading software has problems in that it fails to add/delete the data and the elements of the system for a time period required to generate the new data off-line by backing up the operating data and thus it requires assistance of the off-line.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention to provide a method for upgrading a program, in which new data adapted to a new program, which will be loaded into a processor, are generated by processing old data using a data version adapter, so that a time period required to add/delete elements of the system is minimized within several minutes and stopping of service can be avoided, thereby stably managing the system.

In order to achieve the above-described objects of the present invention, there is provided a method for upgrading data in a processor that can have a plurality of programs and data, comprising the steps of: loading a new program and a means for changing the data; generating a new data adapted to the new program by processing the data, which is operating in the processor, using the means; storing the generated new data in a separate memory area; determining whether the new program is normally operated by implementing the new data; and deleting an old program and old data if the new program is normally operated.

In the preferred embodiment of the present invention, the old program is implemented if the new program is not normally operated.

In another aspect of the present invention, there is provided a method for upgrading data in a plurality of processors, comprising the steps of: stopping both use of the processors; loading a first data version adapter into the first processor and loading a second data version adapter and a new program into the second processor; transmitting old data to the second data version adapter by means of the first data version adapter; generating and storing new data adapted to the new program by processing the transmitted old data by means of the second data version adapter; changing the state of the processors; determining whether the new program is normally operated in the second processor; deleting the old program and the old data if the new program is normally operated; and copying the new program and the new data into the first processor.

In yet another aspect of the present invention, there is provided a method for upgrading data in a plurality of processors, comprising the steps of: stopping both use of the processors; loading a first data version adapter into the first processor and loading a second data version adapter and a new program into the second processor; generating new data adapted to the new program by processing old data by means of the first data version adapter and transmitting and storing the new data to and in the second data version adapter; changing the state of-the processors; determining whether the new program is normally operated; deleting the old program and the old data if the new program is normally operated; and copying the new program and the new data into the first processor.

In the preferred embodiment of the present invention, the method further comprises the steps of: returning the changed processor to its original state if the new program is not normally operated; implementing the old program stored in the first processor and deleting the new program and the new data stored in the second processor; and copying the old program and the old data into the second processor so as to enable both use of the processors.

Therefore, the new data adapted to the new program, which will be loaded into the processor, are generated by processing the old data using the data version adapter, so that a time period required to add/delete elements of the system is minimized within several minutes and stop of service can be avoided, thereby stably managing the system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

A method for upgrading data in accordance with preferred embodiments of the present invention will now be described in detail with reference to the accompanying drawings.

Figure 6:
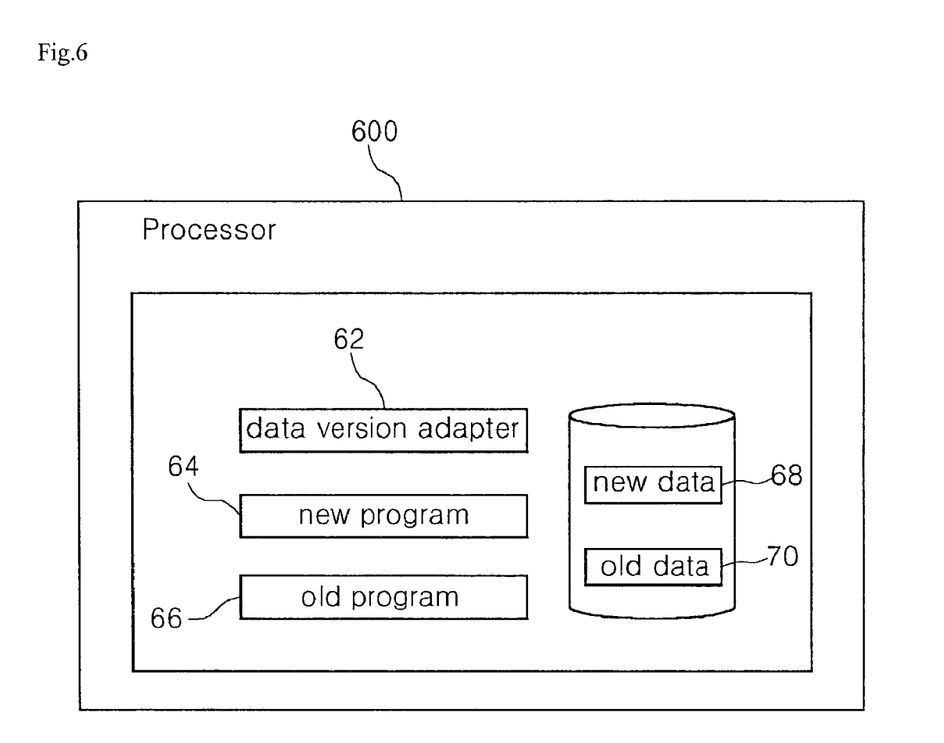
FIG. 6 is a block diagram illustrating a state where a data version adapter and a new program are loaded into a processor to upgrade data in accordance with the present invention.

FIG. 6 is a block diagram illustrating a state where a data version adapter 62 and a new program 64 are loaded into a processor 600 to upgrade a program in accordance with the present invention. The data version adapter 62 changes a structure of an old data 70 to adapt to a new program 64 which is upgraded, and generates and stores a new data 68 by adding contents not included in the old data 70 if a new function is added in accordance with upgrading the program. The data version adapter will now be described in more detail.

The data version adapter 62 is a program that generates new data in accordance with a data rule of the new data by reading an old data. Examples of the data rule of the new data include a rule of added/deleted attributes, a rule of each attribute of added/deleted tuples, and a rule of a table when the table is added/deleted. The basic algorithm is as follows.

1) Information is sent to the data version adapter, which stores the new data by reading the old data for each tuple of each table tuple#, attribute 1, 2, . . . , n (in this case, the read data is dependent. That is, the read data is dependent upon the system).

2) The data version adapter that stores the new data is programmed with the data rule of the new data.

3) The data version adapter that stores the new data upgrades the received old data based on the data rule of the new data to thereby generate the new data.

4) The generated new data is stored in a memory area.

At this time, the processor 600 still stores the old program 66 and the old data 70. This is to operate the processor 600 by means of the old program 66 and the old data 70 if the new program 64 and the new data 68 are not normally operated in the processor 600.

Figure 7:
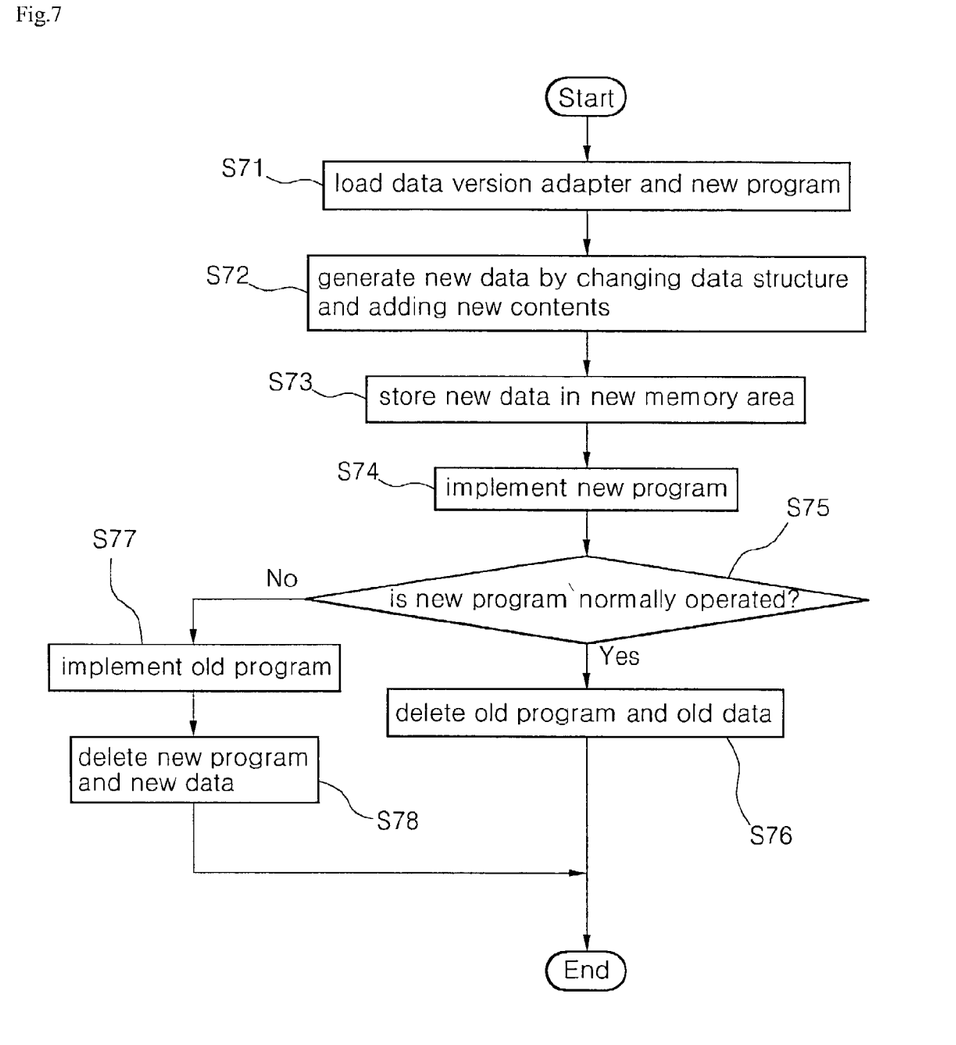
FIG. 7 is a flow chart illustrating a method for upgrading data in accordance with the present invention.

FIG. 7 is a flow chart illustrating the method for upgrading data in accordance with a first embodiment of the present invention. To upgrade the data operating in the processor 600, the data version adapter 62 and the new program 64 are loaded into the processor 600 in step S71.

The data version adapter 62 loaded into the processor 600 reads the old data 70 in accordance with the data structure of the old program 66. Then, the data version adapter 62 changes the structure of the old program 66 to adapt to the new program 64, and preferably at the same time adds new contents not included in the old data 70 to generate the new data 68 in step S72. The generated new data 68 is stored in a new memory area so as not to overlap the memory area that stores the old data 70 in step S73. This is because the old data should be used to operate the old program if the new program is not normally operated, and to avoid collision between the old data and the new data, which may occur because the data version adapter generates the new data while reading the old data.

Once the new data 68 having a structure and contents adapted to the new program 64 is generated as above, the new data 68 is implemented by the new program 64 loaded into the processor 600 in step S74. In this case, it is determined whether the new program 64 is normally operated in the processor 600 in step S75. If the new program 64 is normally operated in the processor 600, the old program 66 and the old data 70 are deleted in step S76. If the new program 64 is not normally operated in the processor 600, the old program 66 is again operated in step S77. Then, the system returns to the original state before the program and the data are upgraded by deleting the new program 64 and the new data 68 in step S78.

The method for loading the data version adapter 62 and the new program 64 into the processor 600 depends on each loading method according to the system. To transmit a new package in the loading method, there may be provided inter processor communication (IPC) of the system, LAN, and serial and parallel communication. The data version adapter 62 and the new program, which are loaded into the processor, are stored in a storage medium such as a hard disk, a flash memory, a digital audio tape (DEAT), and a magneto optical disk (MOD).

A method for generating the new data by processing the old data will now be described. Data attributes of the old data include interface, address, netmask, and speed. If the number of tuples of a table is 10, the data version adapter of the active processor sends data to the data version adapter of the standby processor by reading the data from the old data as follows.

[tuple(1), interface(if1),address(addr1),netmask(net1), speed(sp1)
tuple(2), interface(if2),address(addr2),netmask(net2), speed(sp2)
tuple(3), interface(if3),address(addr3),netmask(net3), speed(sp3)
tuple(4), interface(if4),address(addr4),netmask(net4), speed(sp4)
tuple(5), interface(if5),address(addr5),netmask(net5), speed(sp5)
tuple(6), interface(if6),address(addr6),netmask(net6), speed(sp6)
tuple(7), interface(if7),address(addr7),netmask(net7), speed(sp7)
tuple(8), interface(if8),address(addr8),netmask(net8), speed(sp8)
tuple(9), interface(if9),address(addr9),netmask(net9), speed(sp9)
tuple(10), interface(if10),address(addr10),netmask(net10),speed(sp10)]

It is assumed that bandwidth is added to the data attributes of the new program as the data version adapter of the standby processor reads the data. In this case, a reference value is 10 Mbp, and the new data are generated by processing the data as follows if 5 tuples are additionally provided (it is assumed that each data attribute of the added tuples has an initial value of 0).

[tuple(1),interface(if1),address(addr1),netmask(net1), speed(sp1),bandwidth(10)
tuple(2),interface(if2),address(addr2),netmask(net2), speed(sp2),bandwidth(10)
tuple(3),interface(if3),address(addr3),netmask(net3), speed(sp3),bandwidth(10)
tuple(4),interface(if4),address(addr4),netmask(net4), speed(sp4),bandwidth(10)
tuple(5),interface(if5),address(addr5),netmask(net5), speed(sp5),bandwidth(10)
tuple(6),interface(if6),address(addr6),netmask(net6), speed(sp6),bandwidth(10)
tuple(7),interface(if7),address(addr7),netmask(net7), speed(sp7),bandwidth(10)
tuple(8),interface(if8),address(addr8),netmask(net8), speed(sp8),bandwidth(10)
tuple(9),interface(if9),address(addr9),netmask(net9), speed(sp9),bandwidth(10)
tuple(10),interface(if10),address(addr10),netmask(net10),speed(sp10),bandwidth(10)
tuple(11),interface(0),address(0),netmask(0),speed(0), bandwidth(0)
tuple(12),interface(0),address(0),netmask(0),speed(0), bandwidth(0)
tuple(13),interface(0),address(0),netmask(0),speed(0), bandwidth(0)
tuple(14),interface(0),address(0),netmask(0),speed(0), bandwidth(0)
tuple(15),interface(0),address(0),netmask(0),speed(0), bandwidth(0)]

Adding and deleting the data attributes and the tuples is determined by the new program. The tuples are defined as a set of values related to attributes in a relation table of a relation data base. The relation values in the relation data base are stored in a table. In the table, rows are the attributes and columns are the tuples. The tuples act as records in a non-relation file.

The method for implementing the new program 64 using the new data 68 acts to the method for implementing the new program 64 loaded by stopping the old program 66 which is under the operation. This method depends on a unique method of each system.

Figure 8:
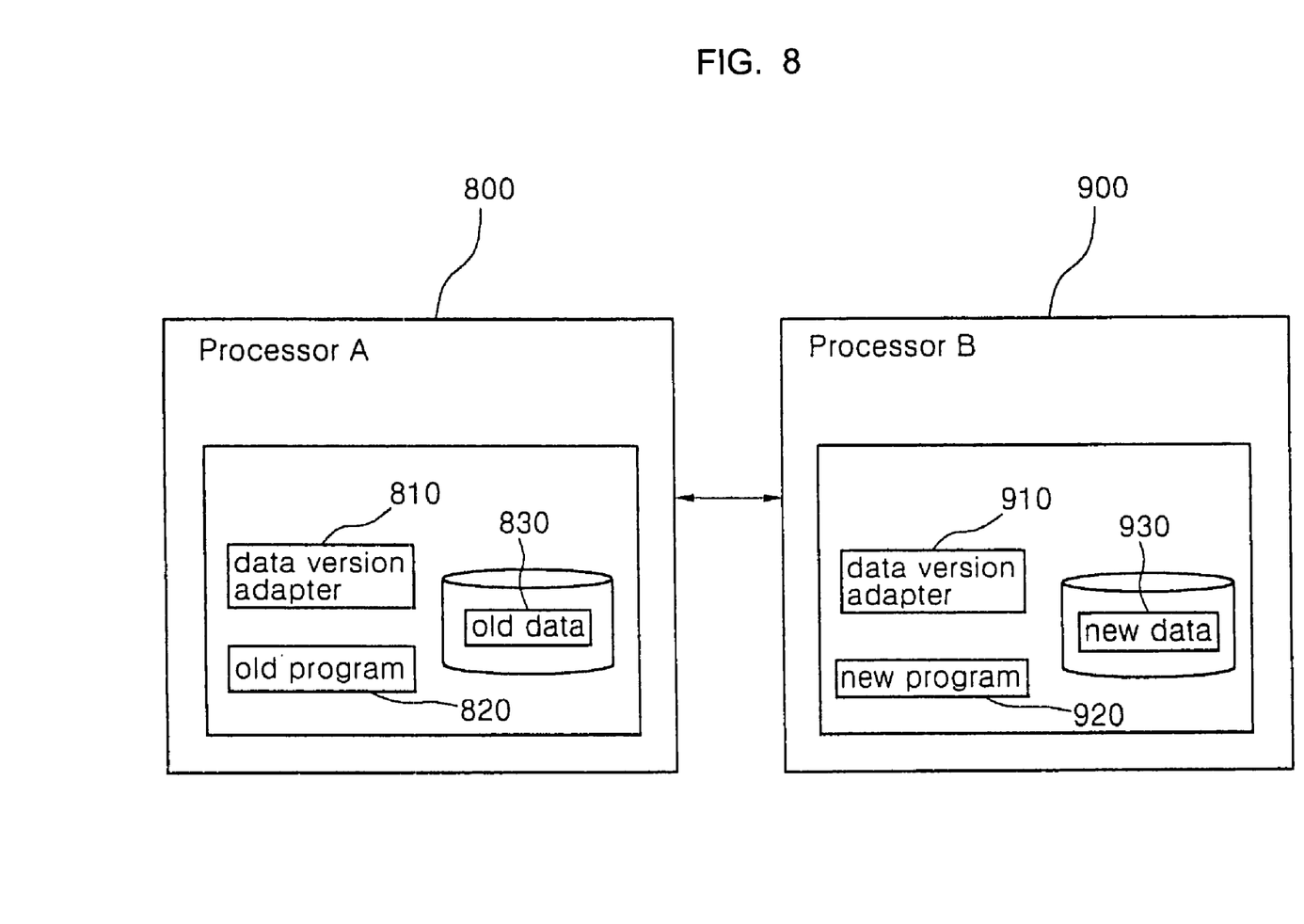
FIG. 8 is a block diagram illustrating a state where a data version adapter and a new program are loaded into a processor to upgrade data of double processors in accordance with the present invention.

FIG. 8 is a block diagram illustrating a state where data version adapters 810 and 910 and a new program 920 are loaded into double processors 800 and 900 to upgrade data of the double processors in accordance with an embodiment of the present invention.

If an active processor 800 and a standby processor 900 are doubly provided in the system, the data version adapter 810 is loaded into the active processor 800 which stores an old program 820 and an old data 830 and the data version adapter 910 and the new program 920 are loaded into the standby processor 900. The old data 830 is then changed to a new data 930 adapted to the new program 920 by means of the data version adapter 810 loaded into the active processor 800 and the standby processor 900. Thus, the data are upgraded in such a way that the programs of the active processor 800 and the standby processor 900 are adapted to the new data. A method for upgrading data of the double processors will be described in more detail with reference to FIG. 9.

Figure 9:
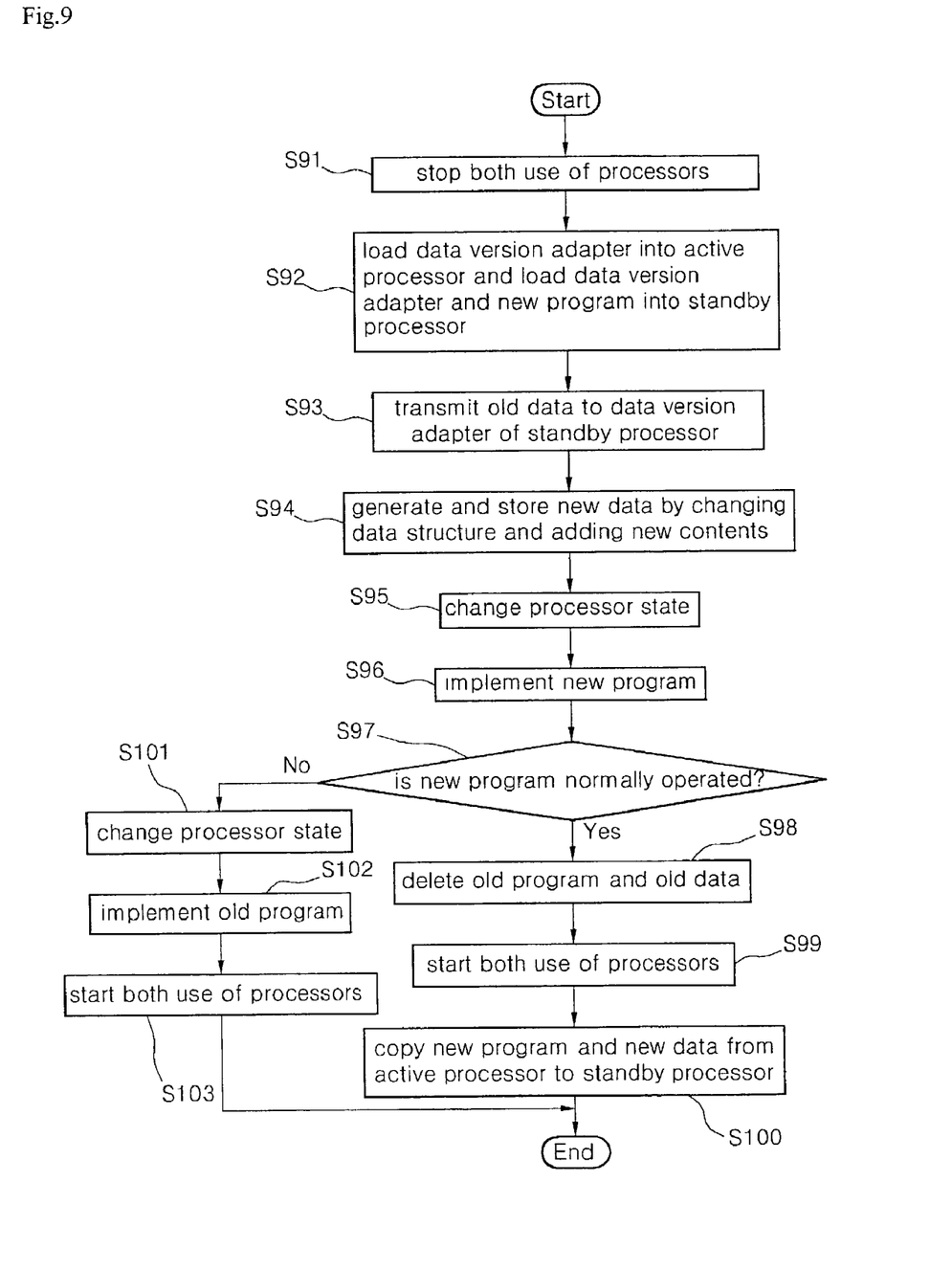
FIG. 9 is a flow chart illustrating a method for upgrading data in double processors in accordance with the first embodiment of the present invention.

FIG. 9 is a flow chart illustrating a method for upgrading data in the double processors 800 and 900 of FIG. 8. It is assumed that the processor 800 (or the processor A) is active and the processor 900 (or the processor B) is on standby.

If the active processor A and the standby processor B are provided, both use the processors A and B which are operating is stopped in step S91. The data version adapter 910 is loaded into the processor A that stores the old program 820 and the old data 830 and at the same time the data version adapter 910 and the new program 920 are loaded into the standby processor B in step S92. The data version adapter 810 loaded into the processor A reads the old data 830 in accordance with the data structure of the old program 820, and transmits the read old data 830 to the data version adapter 910 loaded into the processor B in step S93.

After receiving the old data 830, the data version adapter 910 of the processor B processes the old data 830 to change its structure to adapt to the new program 920 and generates and stores the new data 930 by adding new contents not included in the old data 830 in step S94. The processor A which is active is changed to a standby state and at the same time the processor B which is on standby is changed to an active state in step S95. The new program 920 loaded into the processor B which is changed to the active state is implemented in step S96. Afterwards, it is determined whether the new program 920 is normally operated in the processor B in step S97.

If the new program 920 is normally operated in the processor B, the old program 820 and the old data 830, which are stored in the processor A, are deleted in step S98. Both of the two processors are operated and at the same time the new program 920 and the new data 930 are copied from the processor B to the processor A in step S100.

However, if the new program 920 is not normally operated in the processor B as a result of the step S97, the processor B is changed to the standby state and at the same time the processor A is changed to the active state in step S101. The old program 820 stored in the processor A is implemented and at the same time the new program 920 and the new data 930, which are stored in the processor B, are deleted in step S102. Both processors are operated to return to the original state before upgrading the program in step S103.

Generally, the data version adapters loaded into the active processor and the standby processor in FIG. 8 are different programs. That is, the data version adapter loaded into the active processor acts to transmit the old data to the data version adapter of the standby processor by reading the old data. The data version adapter loaded into the standby processor acts to process the new data by receiving the old data transmitted from the data version adapter loaded into the active processor.

Figure 10:
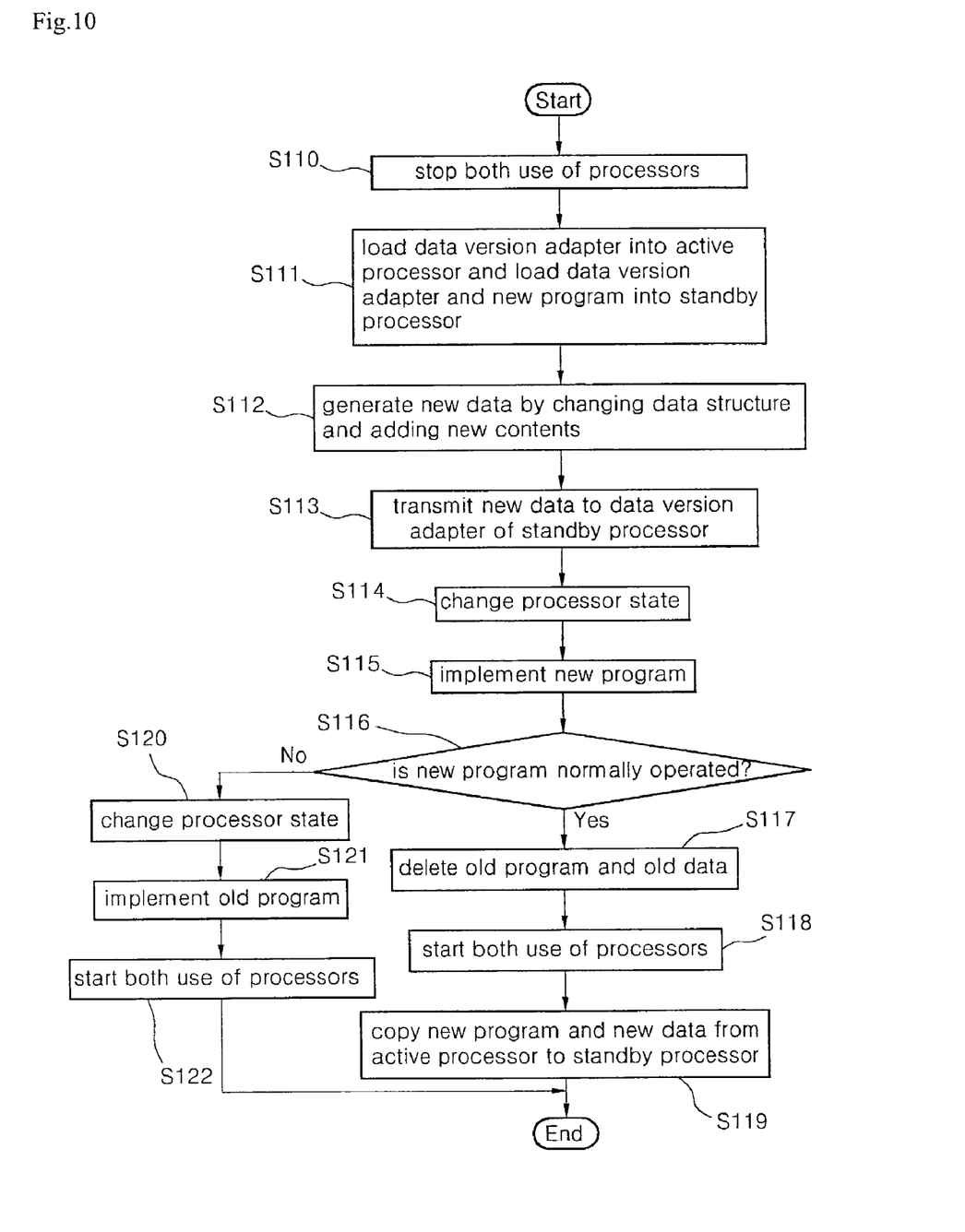
FIG. 10 is a flow chart illustrating a method for upgrading data in double processors that generate new data in an active processor in accordance with the second embodiment of the present invention.

FIG. 10 is a flow chart illustrating a method for upgrading data in the double processors A and B that generate the new data 930 in the active processor in accordance with a second embodiment of the present invention. It is assumed that the processor A is active and the processor B is on standby.

If both the active processor A and the standby processor B are provided, both use the processors A and B which are operating is stopped in step S110. The data version adapter 810 is loaded into the processor A that stores the old program 820 and the old data 830 and at the same time the data version adapter 910 and the new program 920 are loaded into the standby processor B in step S111. After reading the old data 830 in accordance with the data structure of the old program 820, the data version adapter 810 loaded into the processor A processes the read old data 830 to change its structure to adapt to the new program 920 and generates the new data 930 by adding new contents not included in the old data 830 in step S112. At the same time, the new data 930 is transmitted to the data version adapter 910 loaded into the processor B in step S113. The data version adapter 910 of the processor B receives and stores the new data.

Afterwards, processor A which is active is changed to the standby state and at the same time processor B which is on standby is changed to the active state in step S114. The new program 920 loaded into the processor B which is changed to the active state is implemented in step S115.

Next, it is determined whether the new program 920 is normally operated in the processor B in step S116. If the new program 920 is normally operated in the processor B, the old program 820 and the old data 830, which are stored in the processor A, are deleted in step S117. Both processors are operated in step S118 and at the same time the new program 920 and the new data 930 are copied from the processor B to the processor A in step S119.

However, if the new program 920 is not normally operated in the processor B as a result of the step S116, the processor B is changed to the standby state and at the same time the processor A is changed to the active state in step S120. The old program 820 stored in the processor A is implemented and at the same time the new program 920 and the new data 930, which are stored in the processor A, are deleted in step S121. Both processors are operated to return to the original state before upgrading the program in step S122.

Figure 11:
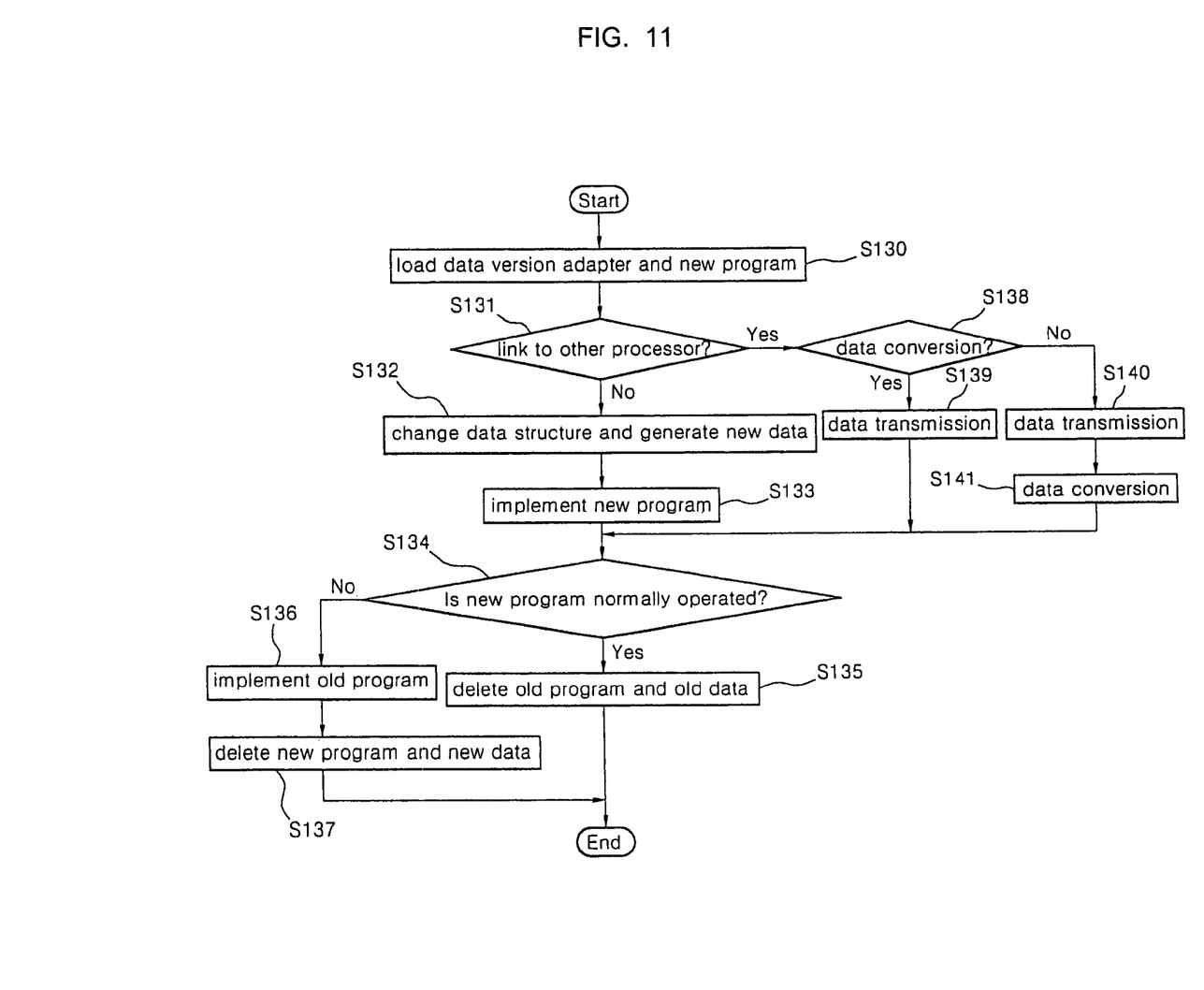
FIG. 11 is a flow chart illustrating a method for upgrading data in accordance with the third embodiment of the present invention.

FIG. 11 is a flow chart illustrating a method for upgrading data in accordance with a third embodiment of the present invention. To adapt old data to a new program, a data version adapter and a new program, which are means for changing old data to new data, are loaded in step S130.

Next, it is determined whether the active processor is linked to the other processor in S131. If the active processor is not linked to the other processor, it corresponds to the method of FIG. 7. In this case, a data structure is changed and new data are generated in step S132.

In step S133, the new program and the new data are implemented using the result of the step S132.

Next, it is checked whether the implemented new data are normally operated in step S134. If the new data are normally operated, the old program and the old data are deleted in step S135. If the new data are not normally operated, the old data are implemented in step S136 and the new data and the new program are deleted in step S137.

However, if the active processor is linked to the other processor as a result of the step S131, it is determined whether to change the old data in the active processor in step S138. If the old data are converted in the processor, it corresponds to the embodiment of FIG. 10. In this case, the data are transmitted in step S139.

However, if the old data are not converted, it corresponds to the embodiment of FIG. 9. In this case, the data are transmitted to the other processor in step S140 and then are converted in step S141. Afterwards, the operation of the steps S134 to S137 is performed.

As described above, the method for upgrading data according to the present invention has at least the following advantages. Since the new data adapted to the new program, which will be loaded into the processor, are generated by processing the old data using the data version adapter, a time period required to add/delete elements of the system is minimized within several minutes and stop of service can be avoided, thereby stably managing the system.

Another embodiment corresponds to a computer readable medium which is in communication with a processor that includes a first program and first data to be used by the first program. The medium includes a first code section which loads a second program and a data version adapter into the processor, a second code section which generates second data to be used by the second program and which is compatible with the second program by modifying the first data, and a third code section which stores the second data in the processor. The second program is different from the second data generated by the second code section, and the second code section may generate the second data by adding or deleting one or more data attributes of the first data.

Another embodiment corresponds to a computer readable medium which is in communication with a first processor which includes a first program and first data to be used by the first program. The medium includes a first code section which loads a second program and a data version adapter into a second processor while said second processor is in a standby state, a second code section which modifies the first data using the data version adapter to generate second data to be used by the second program and which is compatible with the second program, and a third code section which stores the second data in the second processor. The second program is different from the second data generated by the data version adapter, and the second code section generates the second data by adding or deleting one or more data attributes of the first data.

Although the preferred embodiments of the present invention have been described, it is understood that the present invention should not be limited to this preferred embodiments but various changes and modifications can be made by one skilled in the art within the spirit and scope of the present invention as hereinafter claimed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for upgrading data in a processor, comprising:

loading a new program and a changing unit configured to change old data;

generating new data to be used by and adapted to the new program by processing the old data using the changing unit;

storing the generated new data in a separate memory area;

determining whether the new program operates normally by implementing the new data; and deleting an old program and the old data if the new program is determined to be operating normally, wherein the new program is different from the new data generated by the changing unit and wherein the changing unit generates the new data by adding or deleting one or more data attributes of the old data, wherein the data attributes include interface, address, netmask, or speed or a combination thereof, wherein the changing unit generates the new data by further adding one or more tuples to or deleting one or more tuples from the old data, wherein each tuple corresponds to a set of values provided for one or more attributes in a relation table of a relation data base, and wherein the values are stored in the relation table, said table having rows corresponding to said one or more attributes and columns corresponding to the tuples.

2. The method according to claim 1, wherein storing the generated new data in a separate memory area comprises:

storing the new data in either a memory area of a corresponding processor or a memory area of a plurality of processors linked to one another.

3. The method according to claim 2, wherein storing the new data in either a memory area of a corresponding processor or a memory area of a plurality of processors linked to one another comprises:

changing the old data to transmit the changed old data to the linked processors; and storing the transmitted data in the memory area.

4. The method according to claim 2, wherein storing the new data in either a memory area of a corresponding processor or a memory area of a plurality of processors linked to one another comprises:

transmitting the old data to the linked processors; and changing the transmitted old data and storing the data in the memory area.

5. The method according to claim 1, further comprising:

implementing the old program if the new program is not normally operated.

6. The method according to claim 5, wherein the new program and the new data are deleted if the old program is implemented.

7. The method according to claim 1, wherein generating new data to be used by and adapted to the new program by processing the old data using the changing unit comprises:

reading the old data in accordance with a data structure of the old program;

changing the data structure of the old data to adapt to the new program; and adding new contents not included in the old data.

8. The method according to claim 1, further comprising:

implementing the loaded new program by stopping the program which is operating in the processor if the new data is implemented by the new program.

9. The method according to claim 1, wherein the processor stores the old program and the old data for a certain time period before upgrading them.

10. A method for upgrading data in a plurality of processors, comprising:

stopping use of a first processor and a second processor;

loading a first data version adapter into the first processor and loading a second data version adapter and a new program into the second processor;

transmitting old data to the second data version adapter using the first data version adapter;

generating and storing new data to be used by and adapted to the new program by processing the transmitted old data using the second data version adapter, wherein the new program utilizes the new data;

changing states of the first and second processors;

determining whether the new program operates normally in the second processor;

deleting the old program and the old data if the new program is determined to operate normally; and copying the new program and the new data into the first processor, wherein generating the new data includes adding or deleting at least one data attribute of the transmitted old data, said data attribute corresponding to at least one of interface, address, netmask, or speed and wherein said generating further includes modifying the transmitted old data in units of tuples.

11. The method according to claim 10, further comprising:

enabling use of the first and second processors by deleting the old program and the old data and copying the new program and the new data into the first processor.

12. The method according to claim 10, further comprising:

enabling use of the first and second processors by copying the old program and the old data into the second processor.

13. The method according to claim 10, further comprising:

returning the changed processor to its original state if the new program is not normally operated;

implementing the old program stored in the first processor and deleting the new program and the new data stored in the second processor; and copying the old program and the old data into the second processor.

14. The method according to claim 10, wherein the first processor is in an active state and the second processor is in a standby state.

15. A method for upgrading data in a plurality of processors comprising:

stopping use of a first processor and a second processor;

loading a first data version adapter into the first processor and loading a second data version adapter and a new program into the second processor;

generating new data to be used by and adapted to the new program by processing old data using the first data version adapter, wherein the new program is different from the new data;

transmitting to and storing the new data in the second data version adapter generating and storing new data to be used by and adapted to the new program by processing the transmitted old data using the second data version adapter;

changing states of the first and second processors;

determining whether the new program operates normally;

deleting the old program and the old data if the new program operates normally; and copying the new program and the new data into the first processor, wherein generating the new data includes adding or deleting at least one data attribute of the old data, said data attribute corresponding to at least one of interface, address, netmask, or speed and wherein said generating further includes modifying the old data in units of tuples.

16. The method according to claim 15, wherein the old program and the old data are deleted and the new program and the new data are copied into the first processor so as to enable use of the first and second processors.

17. The method according to claim 15, further comprising:

returning the changed processor to its original state if the new program is not normally operated;

implementing the old program stored in the first processor and deleting the new program and the new data stored in the second processor; and copying the old program and the old data into the second processor.

18. The method according to claim 15, wherein the old program and the old data are copied into the second processor so as to enable use of the first and second processors.

19. A method for updating information in a processor which includes a first program and first data to be used by the first program, said method comprising:

loading a second program and a data version adapter into the processor;

generating second data to be used by the second program and which is compatible with the second program by modifying the first data; and storing the second data in the processor, wherein the second program is different from the second data, wherein the second program is an updated version of the first program, wherein said generating includes adding or deleting at least one data attribute of the first data, wherein said data attribute corresponds to at least one of interface, address, netmask, or speed and wherein said generating step further includes modifying the first data in units of tuples.

20. The method according to claim 19, wherein the first data and the second data are, at least temporarily, simultaneously stored in a same storage device of the processor.

21. The method according to claim 20, wherein the first data and the second data are stored in non overlapping locations in said storage device.

22. The method according to claim 19, further comprising:

determining whether the second program operates in a desired manner; and deleting the first program and the first data if the second program is determined to operate in the desired manner.

23. The method according to claim 22, further comprising:

maintaining operation of the first program if the second program is determined not to operate in the desired manner.

24. The method according to claim 19, wherein said generating step includes: modifying at least one of a structure or contents of the first data.

25. A method for updating information in a processing system which includes a first processor storing a first program and first data to be used by the first program, said method comprising:

loading a second program and a data version adapter into a second processor while said second processor is in a standby state;

modifying the first data using the data version adapter to generate second data to be used by the second program and which is compatible with the second program; and storing the second data in the second processor, wherein the second program is different from the second data generated by the data version adapter, wherein the second program is an updated version of the first program, wherein said modifying includes generating the second data by adding or deleting at least one data attribute of the first data, wherein said data attribute corresponds to at least one of interface, address, netmask, or speed, and wherein said modifying step includes modifying the first data in units of tuples.

26. The method according to claim 25, further comprising:
    determining whether the second program operates in a desired manner; and
    if the second program is determined to operate in the desired manner, switching the second processor from standby state to active state and the first processor from active state to standby state.

27. The method according to claim 26, further comprising:
    deleting the first program and the first data from the first processor if the second program is determined to operate in the desired manner.

28. The method according to claim 27, further comprising:
    maintaining the first processor in active state if the second program is determined not to operate in the desired manner.

29. The method according to claim 28, further comprising:
    deleting the second program and the second data from the second processor.

30. The method according to claim 25, wherein said modifying step includes: generating the second data by modifying at least one of a structure or contents of the first data.

31. A computer readable medium in communication with a processor which includes a first program and first data to be used by the first program, said medium comprising:
    a first code section which loads a second program and a data version adapter into the processor;
    a second code section which generates second data to be used by the second program and which is compatible with the second program by modifying the first data; and
    a third code section which stores the second data in the processor, wherein the second program is different from the second data generated by the second code section and wherein the second code section generates the second data by adding or deleting one or more data attributes of the first data, wherein said data attribute corresponds to at least one of interface, address, netmask, or speed, and wherein said second code section generates the second data by modifying the first data in units of tuples.

32. A computer readable medium in communication with a first processor which includes a first program and first data to be used by the first program, said medium comprising:
    a first code section which loads a second program and a data version adapter into a second processor while said second processor is in a standby state;
    a second code section which modifies the first data using the data version adapter to generate second data to be used by the second program and which is compatible with the second program; and
    a third code section which stores the second data in the second processor, wherein the second program is different from the second data generated by the data version adapter and wherein the second code section generates the second data by adding or deleting one or more data attributes of the first data, wherein said data attributes correspond to at least one of interface, address, netmask, or speed, and wherein said second code section modifies the first data in units of tuples.

33. The method of claim 1, wherein each tuple provides a record in a non-relation file.

* * * * *